Figure 4:
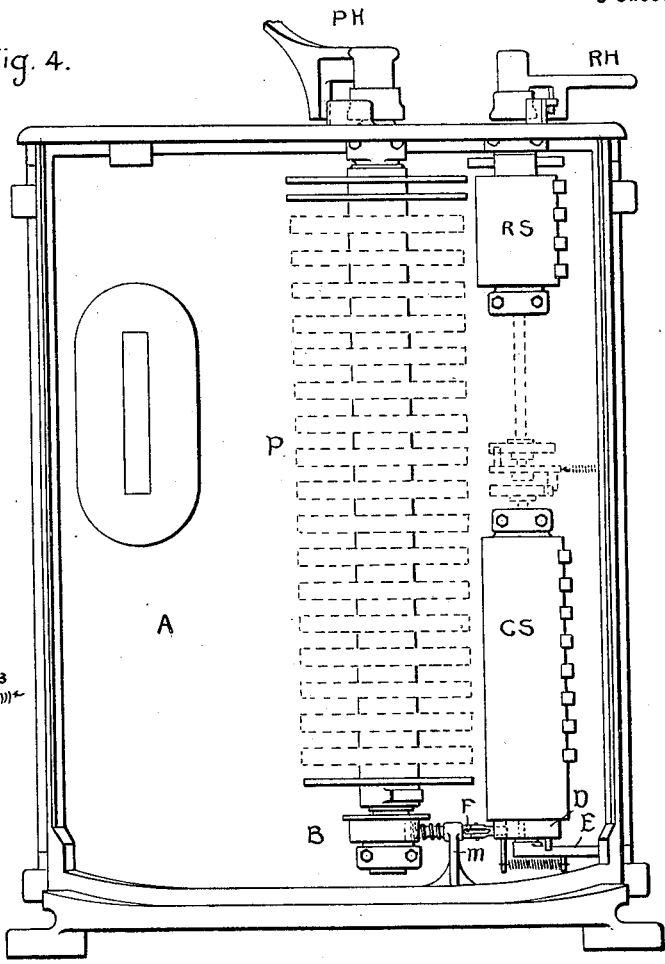

No. 678,854. Patented July 23, 1901.
A. H. ARMSTRONG.
CONTROL OF INDUCTION MOTORS.
(Application filed May 9, 1901.)
(No Model.) 3 Sheets—Sheet 1.
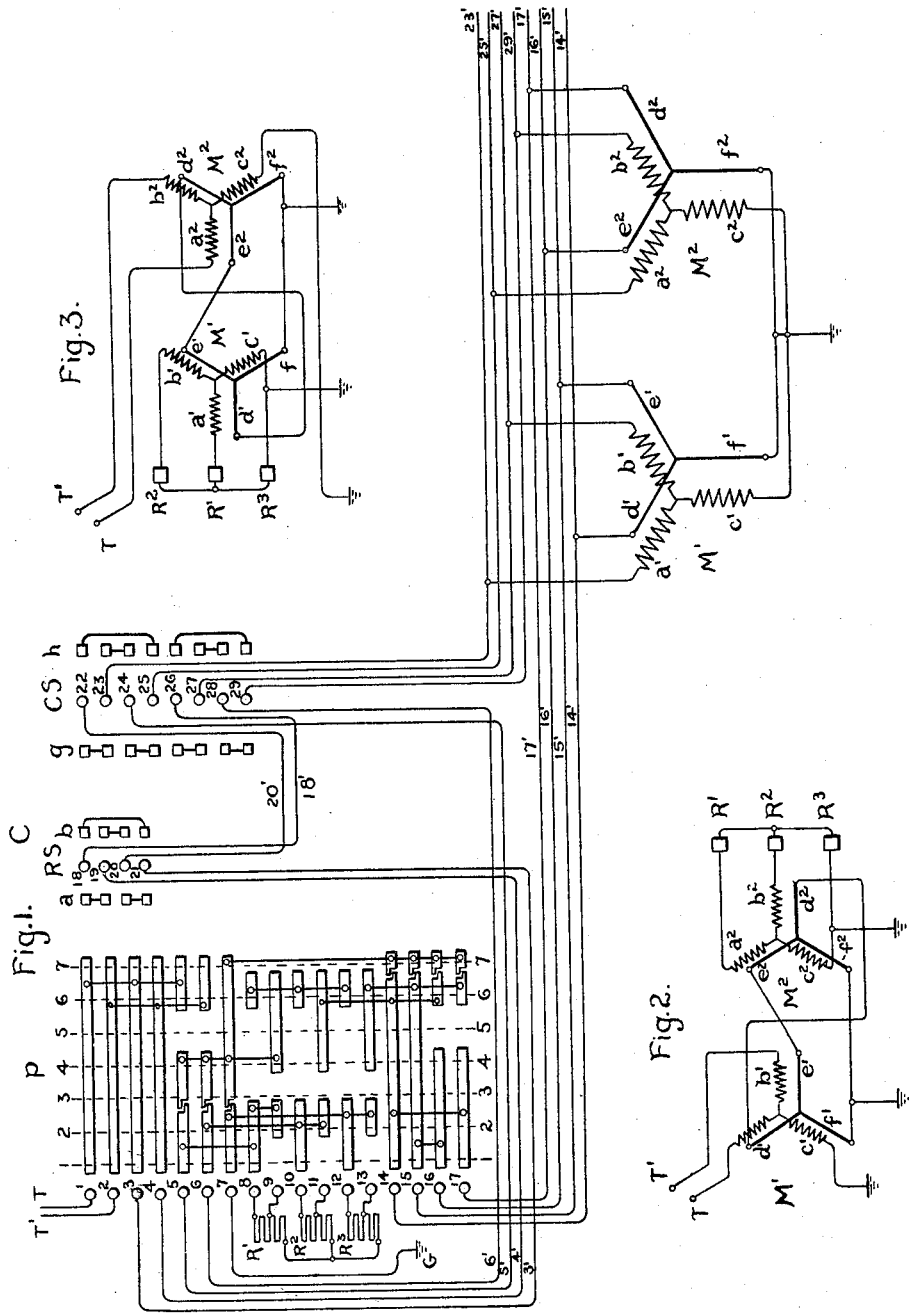
Witnesses.
Marcus L. Byng.
Benjamin B. Hull.
Inventor.
Albert H. Armstrong
by Albert G. Davis
Atty No. 678,854. Patented July 23, 1901.
A. H. ARMSTRONG.
CONTROL OF INDUCTION MOTORS.
(Application filed May 9, 1901.)
(No Model.) 3 Sheets—Sheet 2.

Witnesses.
Marcus L. Byng.
Benjamin B. Hull.

Inventor.
Albert H Armstrong
by Albert G. Davis
Atty.

No. 678,854. Patented July 23, 1901.
A. H. ARMSTRONG.
CONTROL OF INDUCTION MOTORS.
(Application filed May 9, 1901.)
(No Model.) 3 Sheets—Sheet 3.
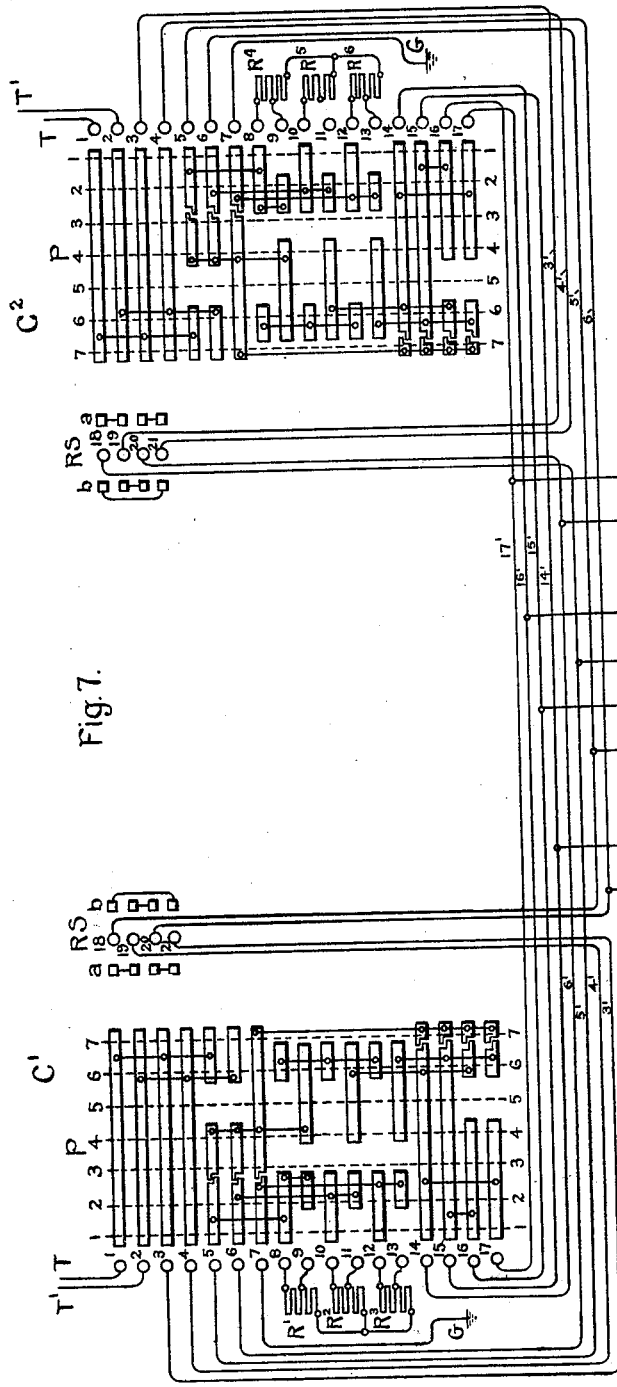
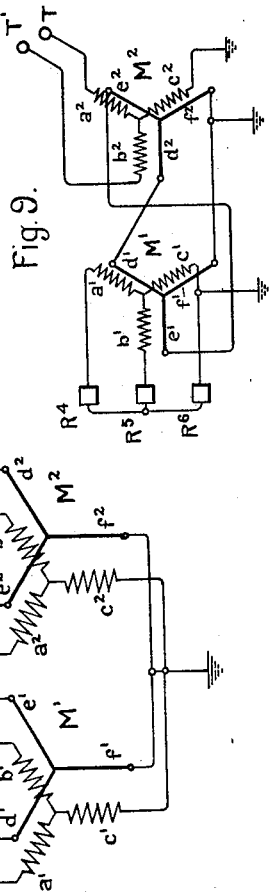
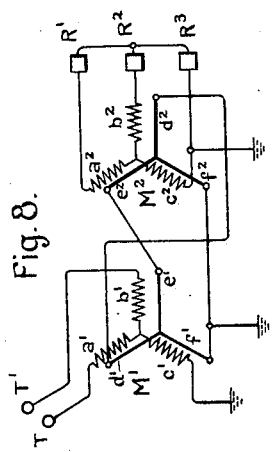
Witnesses.
Inventor.
Albert H. Armstrong.
by Albert G. Davis
Atty.

UNITED STATES PATENT OFFICE.

ALBERT H. ARMSTRONG, OF SCHENECTADY, NEW YORK, ASSIGNOR TO GENERAL ELECTRIC COMPANY, OF NEW YORK.

CONTROL OF INDUCTION-MOTORS.

SPECIFICATION forming part of Letters Patent No. 678,854, dated July 23, 1901.

Application filed May 9, 1901. Serial No. 59,378. (No model.)

*To all whom it may concern:*

Be it known that I, ALBERT H. ARMSTRONG, a citizen of the United States, residing at Schenectady, county of Schenectady, State of New York, have invented certain new and useful Improvements in the Control of Induction-Motors, (Case No. 2,233,) of which the following is a specification.

My invention relates to control systems for alternating-current induction-motors, and has for its object to equalize the heating of such motors when they are operated in tandem. In the tandem connection the induced member of the motor which is connected to the source of supply operates to supply current to the inducing member of a second motor, the induced member of which is short-circuited on itself when there are but two motors in the motor equipment or connected to the inducing member of a third motor when there are more than two. When the motor equipment consists of two motors connected in tandem and driving a common load, both of the motors will operate at substantially one-half the speed at which they would run if both were directly connected to the source of supply. With the motors operating thus at substantially half their normal speed the frequency of the currents flowing in the interconnected windings of the two motors will be substantially one-half the frequency of the currents supplied to the first motor in the tandem connection, and the frequency of the currents flowing in the induced member of the second motor will be substantially zero. The motor which is directly connected to the source of supply must of course carry the magnetizing-current for both machines. In addition since the full frequency and voltage of the source of supply are impressed upon the windings of its inducing member the core loss in this member will be a maximum and the core loss in the induced member half what it would be at zero speed. On the other hand, since the frequency of the currents flowing in the inducing-winding of the second motor is only one-half that of the source of supply the core loss in the inducing member of the second motor will be only about half as large as the core loss in the inducing member of the first motor, and the core loss in its induced member will be nearly negligible. Thus the heating of the motor which is No. 1 in the tandem connection will be very large as compared with the heating of the motor which is No. 2. In the operation of electric-railway systems this is a matter of considerable importance, since it is frequently the practice to go up heavy grades with the motors connected in tandem. In such systems the energy loss in the No. 1 motor is often exceedingly large, and this motor may even get dangerously hot when operating on a road having heavy grades, while the second motor remains comparatively cool.

My present invention is a method for equalizing the heating of induction-motors when connected in tandem; and the method consists in changing or transposing from time to time, as the conditions under which the motors are operated render it advisable, the relative positions of some or all of the motors in the tandem connection. When there are but two motors in the tandem connection, the change is made by transposing the connections of the inducing member of the first motor and the induced member of the second motor, so that part of the time one of the motors will be directly connected to the source, so that it will be No. 1 in the tandem connection, and part of the time will be supplied with current through the windings of the other motor, so that it will be motor No. 2 in the tandem connection. When more than two motors are employed, it is sufficient to change the connections of the end motors only.

My invention will be better understood by reference to the following description, taken in connection with the accompanying drawings, which illustrate some of the arrangements of apparatus which may be used in practicing my invention and which constitute the subject-matter of my application, Serial No. 54,849, filed April 8, 1901.

Figure 6:
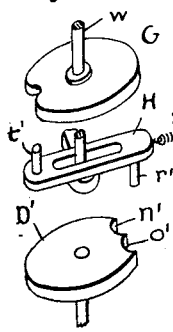
Figure 5:
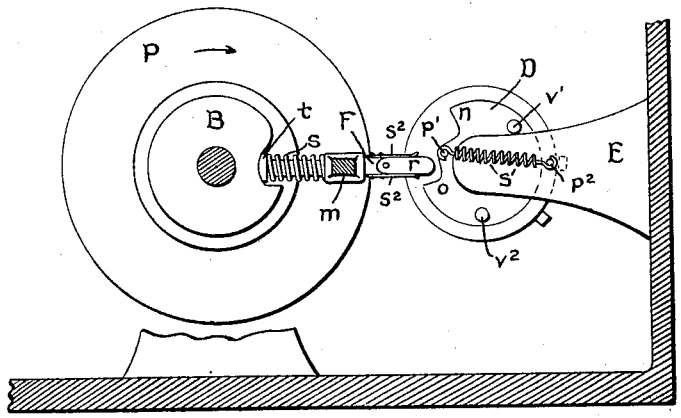

In the drawings, Figure 1 is a diagram of one-half of the car-wiring and one controller for the tandem-multiple control of two induction-motors, the controller being provided with an auxiliary commutating-switch arranged to change the connections of the motors at predetermined intervals, in accordance with the principles of my present invention. Figs. 2 and 3 are diagrams illustrating the motor-circuits for the tandem connection in the two operative positions of the auxiliary commutating-switch of the controller. Figs. 4, 5, and 6 are views showing the mechanical construction of a controller comprising the switches diagrammatically illustrated in Fig. 1. Fig. 7 is a diagram of a car-wiring and controllers, showing how my invention may be applied without providing the controllers with auxiliary commutating-switches. Fig. 8 is a diagram illustrating the motor-circuits for the tandem connection when one of the controllers of Fig. 7 is in operation, and Fig. 9 is a corresponding diagram illustrating the motor-circuits for the tandem connection when the other controller of Fig. 7 is in operation.

My invention may evidently be employed in a motor-control system in which the tandem connection is only one of a series of connections that may be made as well as in a system in which the motors are operated permanently in tandem, and I have chosen to illustrate the arrangements which I have devised for practicing my invention as applied to the tandem-multiple system constituting the subject-matter of my Patent No. 539,404, dated May 21, 1895.

Referring to Fig. 1 of the drawings, M' and $M^2$ represent the windings of two three-phase induction-motors, which are connected, by means of the conductors 14' to 17' and 23' to 29', to a source of supply and to a regulating resistance through the contacts of the controller C. This controller comprises two main controlling-switches P and RS, of which the former operates to control the power connections of the motors and the latter to reverse the direction of motion of the motors, and an auxiliary switch CS for changing the motor connections in a manner hereinafter described. All of these switches are shown with their fixed and movable contacts developed on a plain surface, as is customary in diagrammatically illustrating such structures. The arrangement of the contacts of the switch P is the same as I have shown in my Patent No. 539,404, above referred to. This switch operates to first connect the windings of the motors M' and $M^2$ in tandem with the maximum resistance in circuit with the induced member of the second motor, then to gradually cut out the resistance, then to change the connections from tandem to multiple with a maximum resistance in circuit with the induced members of both motors, and finally to gradually cut out this resistance.

Inasmuch as my present invention pertains only to the tandem connection, I shall in the following description refer only to the first three positions of the power-switch P, in which the tandem connections are completed, reference being made to my aforesaid patent for an explanation of the connections made in the succeeding positions of this switch.

The reversing-switch RS operates only to reverse the connection between two of the motor-terminals and two of the terminals of the three-phase source of supply, thereby reversing the direction of rotation of the motors.

While I have shown in Fig. 1 only one controller C connected to the windings of the motors M' and $M^2$, it is to be understood that the complete equipment for a railway-car will comprehend two controllers C, one at each end of the car, as is customary in such equipments, the second controller being connected to the wires 14' to 17' and 23' to 29' at the right of Fig. 1 in the same manner as the controller which is shown is connected.

The purposes of my present invention are carried out in the arrangement illustrated in Fig. 1 by a commutating-switch CS in each controller, which operates in one of its positions to connect the terminals of the motor M' to those conductors which lead to the source of supply through the contacts of the power and reversing switches and the terminals of the motor $M^2$ to those conductors which lead through contacts on the power-switch to the short-circuiting resistances, and in its other position to reverse these connections, so that the terminals of the motor $M^2$ will be connected to the source of supply and the terminals of the motor M' to the short-circuiting resistances. These connections I have indicated in Figs. 2 and 3, the former of which illustrates the motor connections in the first operative position of the power-switch P when the fixed contacts of the commutating-switch CS are in engagement with the range of contacts marked $g$ and the latter of which illustrates the connections for the same position of the power-switch P when the fixed contacts of the commutating-switch are in engagement with the range of contacts marked $h$. In order to trace these connections in Fig. 1, let it be supposed that the reversing-switch RS is so thrown that its fixed contacts 18 to 21 are in engagement with the range of movable contacts $a$ and that the commutating-switch is so thrown that its fixed contacts 22 to 29 are in engagement with the range of contacts $g$. If now the power-switch P is moved into its first operative position, in which position the fixed contacts 1 to 17, inclusive, lie along the line 1 1, circuits may be traced as follows from the three conductors T, T', and G, which when the system is in operation are connected to the terminals of a three-phase source of supply, one of these connections being shown as a "ground," for the reason that in the operation of electric railways, for which, as above stated, my invention is particularly adapted, it is customary to complete the circuit between one of the terminals of the three-phase source and one of the terminals of the motors on the cars through the rails and the car-wheels, only two trolley-contacts being used: Starting from the conductor T, a circuit leads through the contacts 1 and 3 of the switch P to the conductor 3', thence through contacts 21 and 20 of the reversing-switch to the conductor 20', and through the contacts 22 and 23 of the commutating-switch to the conductor 23' and the terminal of the winding $a'$ on the inducing member of the motor M'. From the conductor T' another circuit leads through the contacts 2 and 4 of the power-switch to the conductor 4', thence through contacts 19 and 18 on the reversing-switch to the conductor 18', and through contacts 26 and 27 of the commutating-switch to conductor 27', to which the terminal of the winding $b'$ of the motor M' is connected. The terminal of the winding $c'$ is connected permanently to ground and through ground to the third terminal of the three-phase source. Two of the terminals of the winding on the induced member of the motor M', this winding being indicated by the lines $d'$, $e'$, and $f'$, are connected, through the conductors 14' and 15', the contacts 14 to 17 of the controller, and the conductors 16' and 17', to two of the terminals of the corresponding winding of motor M², the third terminal of each of these windings being connected to a common ground. Two of the terminals of the remaining winding on the motor M² are connected through the conductors 25' and 29' and the corresponding contacts of the commutating-switch to the conductors 5' and 6' and thence through the contacts 5 and 8 and 6 and 10 of the power-switch to the resistances R' and R². The third terminal of this winding is connected, through the ground connection and the contacts 7 and 12 of the power-switch, to a third resistance R³, the other terminals of these three resistances being connected together. It will thus be seen that with the commutating-switch in the position specified the two motors will be connected in tandem with one of the windings of the motor M', connected to the source of supply, and the corresponding winding of the motor M² short-circuited on itself, this connection being diagrammatically illustrated, as already stated, in Fig. 2. If, however, the commutating-switch is so thrown that its fixed contacts 22 to 29, inclusive, are in engagement with the movable contacts marked $h$, the reversing-switch being supposed for convenience in tracing the circuits to remain in the same position with its fixed contacts 18 to 21 in engagement with the contacts marked $a$, the circuits between the source of supply and the motors may be traced as follows, with the power-switch, as before, in its first operative position: Starting from the conductor T, a circuit leads, as before, through the contacts 1 and 3 of the power-switch to the conductor 3' and through the contacts 21 and 20 of the reversing-switch to the conductor 20' and the contact 22 of the commutating-switch. From this point, however, the circuit instead of continuing through the contact 23, as before, is now completed through the contact 25 and conductor 25', thus leading to the terminal of the winding $a^2$ of the motor M². Similarly the circuit from the conductor T' may be traced through the contacts 2 and 4 of the power-switch to the conductor 4', thence through the contacts 19 and 18 of the reversing-switch to the conductor 18', and the contact 26 of the commutating-switch, from which point the circuit is completed through the contact 29 and the conductor 29', to the terminal of the winding $b^2$ of the motor M², the terminal of the third winding $c^2$ being permanently connected through ground to the remaining terminal of the source of supply. The connections between the winding $d'$, $e'$, and $f'$ of the motor M' and the winding $d^2$ $e^2$ $f^2$ of the motor M² remain unchanged, and of the terminals of the winding $a'$ $b'$ $c'$, which before were connected to the source of supply, the first two are now connected through the conductors 23' and 27' and the contacts 23 and 27 of the commutating-switch to the conductors 5' and 6', which are in turn connected, through the contacts 5 and 8 and 6 and 10 of the power-switch, to the resistances R' and R², the terminal of the winding $c'$ being connected through ground to the third resistance R³. The connections above traced are illustrated in Fig. 3, in which it will be noted that the motor M², which in Fig. 2 is the second motor in the tandem connection, has now become the first motor connected to the source of supply.

The commutating-switch CS may be provided with an operating-handle, so that it can be thrown from one to the other of its operative positions whenever the motorman considers it advisable to make such change, or the commutating-switch may be so arranged that it will be operated indirectly by one of the main controlling-switches. If it is to be operated indirectly, the mechanism by means of which it is actuated should be so chosen that the motor connections will be changed often enough to prevent any one of the motors from heating excessively, the particular arrangement desirable for any one system being determined by the conditions under which the motors are operated.

In electric-railway systems the condition of the grades along the route is the principal determining factor, and depending on the distribution and character of the same the commutating-switch may be arranged to be operated by the power-switch each time that it is moved from its "off" position or every third or forth time, as the conditions under which the motors are operated seem to demand, or by the reversing-switch in case an infrequent operation of the commutating-switch is sufficient to accomplish the desired results. If the commutating-switch is operated by the power-switch, the motor connections will of course be changed every time that the controller is moved from its "off" to "on" position, or at least whenever a predetermined number of such movements have been made. Such an arrangement will be required whenever the grades are excessive and frequent, so that it is inadvisable to operate the motors over the whole route without change of connections. If the commutating-switches are arranged to be operated by the reversing-switches, the motor connections will be changed at the end of every round trip if the car is operated in one direction over the line from one controller and in the other direction from the controller at the other end of the car, the change in connection being made at one or the other end of the line, according to the relative positions of the commutating-switches of the two controllers at the start. Thus if the commutating-switches in the two controllers occupy relatively opposite positions when the car is in motion from one end of the route the transfer of the control to the controller at the other end of the car will throw the commutating-switch of that controller into a position such that it will connect the motors in the same relation in the tandem connection as they were previously connected by the commutating-switch of the other controller. If, however, the commutating-switches in the two controllers occupy the same relative positions when the car is starting out from one end of the route, the transfer of the control to the controller at the other end of the car will bring the commutating-switch into a position such that it will reverse the position of the motors in the tandem connection. If it is desired that the connections shall be changed at each end of the route, the functions of the contacts of the commutating-switches may be carried out by a proper relative arrangement of the contacts of the two power-switches, and in Fig. 4 of the drawings I have indicated such an arrangement.

The operating means for the commutating-switch which I have chosen for illustration in the present application is so arranged that the said switch will be thrown each time that the main controlling-switch with which it is operatively connected is operated; but evidently it might be arranged so as to be thrown only after a predetermined number of such movements have been completed.

Referring to Figs. 4 and 5 of the drawings, which illustrate the controller construction in so far as it relates to my present invention, A indicates a controller-casing in which are mounted the three controller drums or cylinders P, RS, and CS. These cylinders carry the rectangular contacts, which are shown in development in Fig. 1 and are arranged to be rotated, so that these contacts come into engagement with a series of fixed fingers corresponding to the circular contacts shown in Fig. 1. These fingers are mounted in the customary manner, and for this reason it has been deemed unnecessary to illustrate them in the figures showing the construction of the controller. The reversing-switch RS is thrown into one or the other of its operative positions by means of the handle RH. The power-switch P is rotated by means of a controller-handle, the lower portion of which is shown at PH. The commutating-cylinder CS is mounted below the reversing-switch cylinder and is provided at its lower end with a cam-shaped plate D, having two adjacent notches $n$ and $o$ on the side toward the power-cylinder. A spring $s'$ is fastened at one end to a pin $p^2$ on the bracket E, which supports the lower bearing of the commutating-switch, and at its other end is fastened to a pin $p'$ on the commutating-switch cylinder, these pins being so positioned that as the commutating-switch is moved from one to the other of its operative positions the spring will pass over the point about which the commutating-cylinder rotates, and will thus operate to throw it forcibly into either one of its operative positions and hold it there until the actuating means is again operated. Stops $v'$ and $v^2$ are provided for limiting the throw of the switch. The shaft of the switch P carries at its lower end a cam B, against which bears the head $t$ of a member F, which is suitably supported in a bearing in the upper end of a bracket $m$, projecting from the base of the controller. The member F carries at its outer end a pivoted pawl $r$, which is normally held in the position shown in the drawings by means of the spring members $s^2 s^2$. A spring $s$ is provided for maintaining the head $t$ of the member F always in engagement with the face of the cam B. The arrangement of the parts shown in Fig. 5 corresponds to the off position of the main cylinder P. If now this cylinder is rotated right-handedly, the surface of the cam B will operate to force the pawl $r$ into engagement with the notch $o$ in the plate D on the base of the commutating-switch, and the commutating-switch will be rotated until the spring $s'$ passes over the center of support of the commutating-switch, after which the said switch will be thrown by the force of the spring into its other operative position. The switch will remain in this position throughout the movement of the controller, the member F, after it has once been moved forward by the cam B, being held in its forward position throughout the movement of the controller until it is again returned to its off position. The movement of the commutating-switch from the position shown in Fig. 5 into its other operative position will operate to bring the notch $n$ into such a position that when the member F is again projected forward the pawl $r$ will engage the notch $n$ and throw the commutating-switch back into the position shown in the drawings. Whenever, therefore, the power-cylinder P is returned to its off position and is again moved forward the pawl $r$ will engage one or the other of the notches $n$ and $o$, according to the position of the commutating-switch and will throw the said switch into its other operative position. In Fig. 4 I have also indicated in dotted lines how the commutating-switch may be operated from the reversing-switch cylinder instead of from the power-cylinder, and in Fig. 6 I have shown more in detail the mechanism which is illustrated in dotted lines in Fig. 4. Referring to this latter figure, G indicates a cam mounted on a shaft $w$, arranged to rotate with the reversing-switch. D' is a notched plate similar in all respects to the plate D, (shown in Fig. 5;) but in this case it is mounted on the upper end of the commutating-switch cylinder instead of below it. H is a slotted member having at one end a pin $t'$, adapted to engage the edge of the cam G, and at its other end a pin $r'$, adapted to engage one or the other of the notches $n'$ and $o'$. A spring $s^3$ operates to maintain the pin $t'$ always in engagement with the cam G. This mechanism operates in the same manner as that shown in Fig. 5. When the reversing-switch is in its off position, the pin $t'$ rests in the notched portion of the cam G; but whenever it is moved in either direction into one of its operative positions the pin $r'$ is drawn into engagement with one or the other of the notches $n'$ and $o'$ and the commutating-switch is moved until the spring $s^3$ passes over the pivot on which the switch turns and throws it into its operative position.

The use of a commutating-switch operatively connected to one of the main controlling-switches of each controller is preferable when the grades are excessive or frequent or whenever they are heavier in one direction of running than in the other; but when the grades are substantially equal in both directions or whenever they are infrequent it may be sufficient if the arrangement of the motors in the tandem connection is reversed at each end of the run. In the latter case the separate commutating-switch in each controller may be dispensed with and the connections may be so arranged that the contacts of the power-switch in one controller will perform the functions of one of the sets of contacts of the commutating-switch, and the contacts of the power-switch in the other controller the functions of the other set. Such an arrangement is illustrated in Fig. 7 of the drawings, in which I have shown the two motors M' and M² connected by suitable wiring to the contacts of the two controllers C' and C². As shown in this figure, each controller comprises a power-switch P and a reversing-switch RS, similar in construction to the corresponding switches shown in Fig. 1; but in place of the commutating-switch of Fig. 1 the wiring is so arranged that whenever the controller C' is in operation the motor M' will be motor No. 1 in the tandem connection, and whenever the controller C² is in operation the motor M² will be No. 1 in the tandem connection. This result is accomplished by reversely connecting the windings $a'$ $b'$ $c'$ and $a^2$ $b^2$ $c^2$ of the motors to the two controllers. Supposing the reversing-switch RS of the controller C' to be thrown into such a position that its fixed contacts 18 to 21, inclusive, are in engagement with the contacts marked $a$, if the power-switch of this controller is moved to its first operative position, with the fixed contacts 1 to 17, inclusive, lying along the line 1 1, the motor-circuits will be completed as follows: Starting from the conductor T, a circuit may be traced through the contacts 1 and 3 to the conductor 3', thence through contacts 21 and 20 of the reversing-switch to the terminal of the winding $a'$ of the motor M'. Starting from the conductor T', a circuit may be traced through the contacts 2 and 4 to the conductor 4' and thence through contacts 19 and 18 of the reversing-switch to the terminal of the winding $b'$ of the motor M'. The third circuit is through the common ground connection to which the source and the terminal of the winding $c'$ are connected. The windings $d'$ $e'$ $f'$ and $d^2$ $e^2$ $f^2$ are connected by the controller-contacts the same as in the diagram of Fig. 1, and these connections need not therefore be described in connection with the present figure. The terminals of the windings $a^2$ and $b^2$ of the motor M² are connected through contacts 5 and 8 and 6 and 10 to the resistances R' and R², the terminal of the remaining winding $c^2$ being connected through a common ground connection to the resistance R³. The connections above described are illustrated in Fig. 8 of the drawings, from which it will be seen that whenever the controller C' is operated to connect the motors in tandem the motor M' will be No. 1 in tandem connection. Supposing now that the controller C' is thrown to its off position and that the reversing-switch of the controller C² is thrown into such a position that its contacts 18 to 21 engage with the contacts marked $a$, if the power-cylinder P of this controller is moved into its first operative position the motor-circuits will be so arranged that the motor M² will be No. 1 in the tandem connection. For tracing the circuits it will be seen that a circuit leads from the conductor T through the contacts 1 and 3 of the power-switch to the conductor 3', thence through contacts 19 and 18 of the reversing-switch to the terminal of the winding $a^2$ of the motor M². A circuit from the conductor T' leads through contacts 2 and 4 of the power-switch to the conductor 4', and thence through contacts 21 and 20 of the reversing-switch to the terminal of the winding $b^2$ of the motor M², the connection between the source and the terminals of the windings $c^2$ being made through the common ground connection. The windings $d'$, $e'$, and $f'$ and $d^2$ $e^2$ $f^2$ of the two motors will be connected the same as when the other controller was in operation; but the other winding of the motor M' will have its terminals connected through the controller-contacts and the ground connection to the resistances R⁴, R⁵, and R⁶ of the controller C². The connections for the tandem position of this controller C² are shown in Fig. 9 of the drawings, from which it will be seen that the motor M² is No. 1 in the tandem connection.

What I claim as new, and desire to secure by Letters Patent of the United States, is—

1. The method of equalizing the heating of induction-motors operated in tandem, which consists in changing from time to time the relative positions of the motors in the tandem connections.

2. The method of equalizing the heating of induction-motors operated in tandem, which consists in transposing from time to time the connections of the inducing member of the first motor and of the induced member of the last motor in the tandem connection.

In witness whereof I have hereunto set my hand this 7th day of May, 1901.

ALBERT H. ARMSTRONG.

Witnesses:
BENJAMIN B. HULL,
MARGARET E. WOOLLEY.